United States Patent
Kim et al.

(10) Patent No.: US 8,379,142 B2
(45) Date of Patent: Feb. 19, 2013

(54) APPARATUS AND METHOD FOR BALANCING COLOR OF FLASHED IMAGE USING DEPTH ESTIMATION

(75) Inventors: Seong Dae Kim, Daejon (KR); Sung Soo Hwang, Busan (KR); Su Jung Kim, Daegu (KR); Hwang Soo Lee, Gyeonggi-do (KP); Young Serk Shim, Seoul (KR); Joon Sik Choi, Jeollabukdo (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 439 days.

(21) Appl. No.: 12/648,747

(22) Filed: Dec. 29, 2009

(65) Prior Publication Data

US 2011/0115941 A1  May 19, 2011

(30) Foreign Application Priority Data

Nov. 17, 2009  (KR) .................. 10-2009-0110738

(51) Int. Cl.
*H04N 5/222*  (2006.01)
*H04N 9/73*  (2006.01)
(52) U.S. Cl. ..... 348/370; 348/371; 348/135; 348/224.1; 396/106
(58) Field of Classification Search ............... 348/370, 348/371; 396/106–109, 201–204
See application file for complete search history.

(56) References Cited

U.S. PATENT DOCUMENTS

| 2002/0149689 A1* | 10/2002 | Sannoh et al. | 348/333.02 |
| 2003/0025822 A1* | 2/2003 | Shimada | 348/370 |
| 2003/0052991 A1* | 3/2003 | Stavely et al. | 348/370 |
| 2003/0137597 A1* | 7/2003 | Sakamoto et al. | 348/371 |
| 2005/0190288 A1* | 9/2005 | Yamada | 348/371 |
| 2010/0074546 A1* | 3/2010 | Ishigami et al. | 382/251 |

* cited by examiner

*Primary Examiner* — Chieh M Fan
*Assistant Examiner* — Dwight C Tejano
(74) *Attorney, Agent, or Firm* — Scully, Scott, Murphy & Presser, P.C.

(57) ABSTRACT

Disclosed herein is an apparatus and method for balancing the color of a flashed image using depth estimation. The apparatus includes a depth value measurement unit, a region identification unit, a color impression estimation unit, and a color balancing unit. The depth value measurement unit measures the depth values of the respective regions of an image to be captured using a camera preview image. The region identification unit identifies the regions of the preview image as a region influenced by camera flash or a region not influenced by camera flash using the depth values measured by the depth value measurement unit. The color impression estimation unit estimates the color impression of actual illumination in the region not influenced by camera flash. The color balancing unit corrects the color of the region influenced by camera flash.

10 Claims, 2 Drawing Sheets

APPARATUS AND METHOD FOR BALANCING COLOR OF FLASHED IMAGE USING DEPTH ESTIMATION

BACKGROUND

1. Field

The present application relates generally to an apparatus and method for balancing the color of a flashed image using depth estimation, and, more particularly, to an apparatus and method for balancing the color of a flashed image using depth estimation, which is capable of preserving a color impression unique to illumination when a photograph is taken under illumination of low brightness and a specific color impression.

2. Description of the Related Art

In general, in the case of photographing, when the brightness of illumination is insufficient, an image is dark. In contrast, when the exposure time of a lens is extended so as to prevent the above phenomenon, the blurring of the entire image occurs due to the movement of a subject or the movement of the hand.

Although the problem of the brightness of illumination may occur outdoors, such a problem frequently occurs in an indoor space in which illumination is set to a low brightness so as to create a specific atmosphere and a specific color impression is produced.

In order to overcome the problem, many methods have been proposed. The representatives of the methods include gamma correction or histogram equalization. However, although these methods enable a detailed region of interest within a dark area to be identified by extending the brightness of the dark area, it is disadvantageous in that the contrast is not natural and color distortion is excessive.

Furthermore, there is a method of increasing the amount of light absorbed by a lens using camera flash as additional illumination means. In general, when camera flash is used, an advantage may arise in that the brightness of illumination is increased by adding artificial light, thereby increasing color contrast. However, since the area which is influenced by camera flash is limited, the contrast between an area influenced by the camera flash and an area not influenced by the camera flash is emphasized, thus creating an unnatural image. Furthermore, the atmosphere which an indoor space itself has cannot be produced due to the intense light which is not related to background illumination.

SUMMARY

The present invention, in one aspect, may provide an apparatus and method for balancing the color of a flashed image which is configured to estimate the color impression of illumination using a region not influenced by camera flash and correct the color of a region influenced by camera flash based on the estimated color impression using the region not influenced by camera flash, so that the unnaturalness between a region influenced by camera flash and a region not influenced by camera flash may be decreased, the color contrast of objects within an image is increased, and an image which faithfully reflects an atmosphere under existing illumination is created.

The present invention, in one aspect, may provide an apparatus for balancing the color of a flashed image using depth estimation, including a depth value measurement unit for measuring the depth values of respective regions of an image to be captured using a camera preview image; a region identification unit for identifying the regions of the preview image as a region influenced by camera flash or a region not influenced by camera flash using the depth values measured by the depth value measurement unit; a color impression estimation unit for estimating the color impression of actual illumination in the region not influenced by camera flash; and a color balancing unit for correcting color of the region influenced by camera flash.

The depth value measurement unit may measure an extent of blurring per pixel based on results from a single preview image or results from accumulation of a plurality of preview images, and measure the depth value of each region based on the measured extent of blurring per pixel.

The region identification unit may determine whether each of the respective regions of the preview image is present within a predetermined range of the camera flash using the depth values measured by the depth value measurement unit.

The region identification unit may identify each region as the region influenced by a flash predetermined range if, as a result of the determination, the region is present within the predetermined range, or as the region not influenced by the camera flash if the region is not present within the predetermined range.

The color impression estimation unit may estimate the color impression of actual illumination by estimating the reference white of the region which was identified as the region not influenced by the flash.

The color balancing unit may correct the color of the region identified as the region influenced by camera flash based on reference white estimated by the color impression estimation unit.

Additionally, the present invention may provide a method of balancing color of a flashed image using depth estimation, including (a) a depth value measurement unit measuring depth values of respective regions of an image to be captured using a camera preview; (b) when photographing is performed using camera flash, a region identification unit determines whether each of the respective regions of the preview image is present within a predetermined range of the camera flash using the depth values measured by the depth value measurement unit; (c) the region identification unit identifies each region as a region influenced by the camera flash if, as a result of the determination at step (b), the former region is present within the predetermined range, or as a region not influenced by the camera flash if the former region is not present within the predetermined range; (d) a color impression estimation unit estimates a color impression of actual illumination by estimating reference white of the region which was identified as the region not influenced by the camera flash; and (e) a color balancing unit corrects color of the region identified as the region influenced by camera flash based on the reference white estimated at step (d).

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
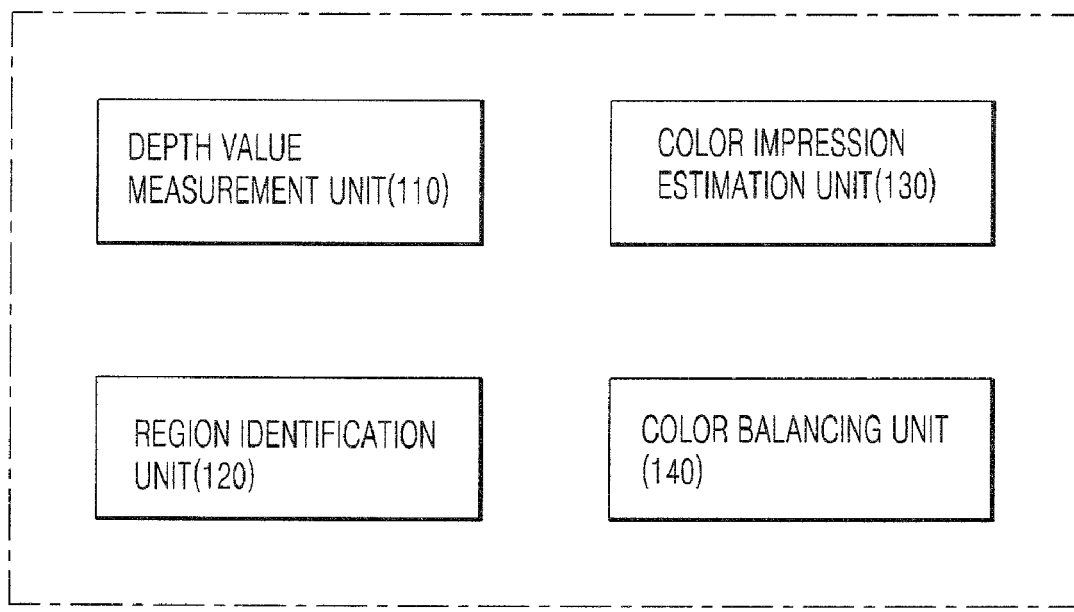
FIG. 1 is a diagram conceptually illustrating the entire construction of an apparatus for balancing the color of a flashed image.

Reference now should be made to the drawings, in which the same reference numerals are used throughout the different drawings to designate the same or similar components.

The detailed characteristics and advantages will be apparent from the following description based on the accompanying drawings. Prior to the description, it will be noted that if detailed descriptions of known functions and constructions related to the present invention may unnecessarily make the gist of the present invention unclear, the descriptions will be omitted below.

An apparatus and method for balancing the color of a flashed image will be described below with reference to FIGS. 1 to 2.

FIG. 1 is a diagram conceptually illustrating the entire construction of an apparatus for balancing the color of a flashed image 100. As shown in this drawing, the apparatus for balancing the color of flashed image 100 includes a depth value measurement unit 110, a region identification unit 120, a color impression estimation unit 130, and a color balancing unit 140.

The depth value measurement unit 110 functions to measure the depth values of respective regions of an image to be captured using a camera preview image. Here, the reason why a preview image is used is to prevent a user from being inconvenienced by the requirement of an additional image having to be captured by the user. Meanwhile, the respective regions refer to respective regions of objects inside a preview input image.

When the extent of blurring per pixel in a preview image is measured, it can be seen that blurring frequently occurs in a region close to a camera, while blurring rarely occurs in a region remote from a camera. The extent of blurring per pixel can be checked by acquiring and accumulating a plurality of preview images. Alternatively, an applicable automatic focusing technique may be used or an existing method of estimating depth may be applied to a preview image.

That is, the depth value measurement unit 110 measures the extent of blurring per pixel based on the results from a single preview image or results from the accumulation of a plurality of preview images and measures the depth value of each region based on the measured extent of blurring per pixel.

Furthermore, the region identification unit 120 functions to identify each region of a preview image as a region influenced by camera flash or a region not influenced by camera flash using the depth values measured by the depth value measurement unit 110.

In great detail, the region identification unit 120 determines whether each region of a preview image is present within the predetermined range of the camera flash using the depth values measured by the depth value measurement unit 110.

If, as a result of the determination, each region is present within the predetermined range, the region identification unit 120 identifies this region as a region influenced by a flash predetermined range. If each region is not present within the predetermined range, this region is identified as a region not influenced by a flash.

The range of a typical camera flash is 0.7~5.0 m in the case of a telephoto lens camera or 0.7~4.0 m in the case of a wide-angle lens camera, so that the region identification unit 120 can identify regions by taking into consideration the error ranges of depth estimation. Since the range of camera flash may vary according to the characteristics of the camera, the present invention is not limited to any range.

Furthermore, the color impression estimation unit 130 functions to estimate the color impression of the actual illumination in a region not influenced by camera flash.

In detail, the color impression estimation unit 130 estimates the color impression of the actual illumination by estimating the reference white of a region which is identified as a region not influenced by a flash. Here, the method used in existing automatic white balance may be used as a method of estimating reference white.

Furthermore, the color balancing unit 140 functions to correct the color of a region influenced by camera flash.

In greater detail, the color balancing unit 140 corrects the color of a region identified as a region influenced by a flash based on the reference white estimated by the color impression estimation unit 130 using Equation 1. That is, the color balancing unit 140 corrects the color of a region where the distortion of color was made by a flash using reference white.

$$\begin{bmatrix} R \\ G \\ B \end{bmatrix} = \begin{bmatrix} R_w/R_r & 0 & 0 \\ 0 & G_w/G_r & 0 \\ 0 & 0 & B_w/B_r \end{bmatrix} \begin{bmatrix} R' \\ G' \\ B' \end{bmatrix} \quad (1)$$

where R, G, B refer to corrected colors, $R_w$, $G_w$, $B_w$ refer to reference white in a region not influenced by a flash, $R_r$, $G_r$, $B_r$ refer to reference white in a region influenced by a flash, and R', G', B' refer to non-corrected colors in a region influenced by a flash.

Besides this basic color correction, the correction of color may be performed using a method such as gamma correction or Wide Dynamic Range Compression (WDRC). This is because a color saturation phenomenon may occur in a specific region due to camera flash.

A method of correcting the color of a flashed image using the apparatus for balancing the color of a flashed image 100 having the above-described construction will be described below with reference to FIG. 2.

Figure 2:
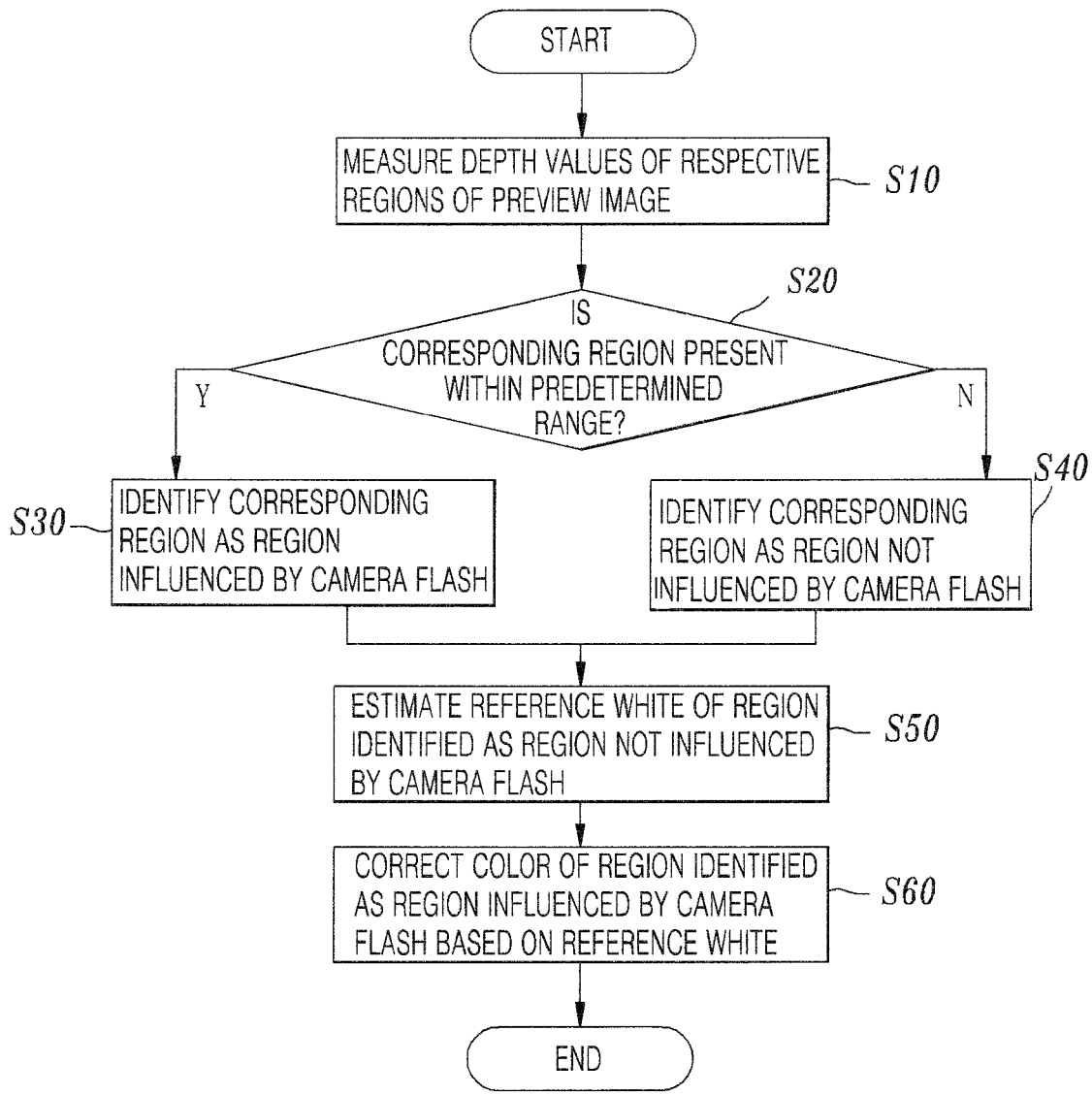
FIG. 2 is a flowchart showing the entire construction of a method of balancing the color of a flashed image using depth estimation.

FIG. 2 is a flowchart showing the entire construction of a method of correcting the color of a flashed image using depth estimation according to the present invention. As shown in this drawing, the depth value measurement unit 110 measures the depth values of respective regions of an image to be captured using a camera preview at step S10.

Thereafter, when photographing is performed using camera flash, the region identification unit 120 determines whether each region of a preview image is present within the predetermined range of the camera flash using the depth values measured by the depth value measurement unit 110 at step S20.

If, as a result of the determination at step S20, each region is present within the predetermined range, the region identification unit 120 identifies this region as a region influenced by a flash at step S30. In contrast, if a region is not present within the predetermined range, this region is identified as a region not influenced by a flash at step S40.

Furthermore, the color impression estimation unit 130 estimates the color impression of the actual illumination by estimating the reference white of a region identified as a region not influenced by a flash at step S50.

Thereafter, the color balancing unit 140 corrects the color of a region identified as a region influenced by a flash based on the reference white estimated by the color impression estimation unit 130 at step S60.

In one aspect, the color impression of the illumination can be accurately estimated because illumination is estimated using only a region not influenced by camera flash, so that the color contrast of an object to be captured can be increased and a natural image in which the color impression of the original illumination is preserved can be acquired because the color distorted by camera flash is corrected using the estimated color impression.

Furthermore, the mood of an image can be preserved by increasing the color contrast of an object captured using camera flash as an additional illumination means and enabling the color impression of the original illumination to be represented.

Moreover, color can be corrected by a single performance of photographing without additional photographing because depth values are estimated using a preview image.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for balancing color of a flashed image using depth estimation, comprising:
   a depth value measurement unit for measuring depth values of respective regions of an image to be captured using a camera preview image;
   a region identification unit for identifying the regions of the preview image as a region influenced by camera flash or a region not influenced by camera flash using the depth values measured by the depth value measurement unit;
   a color impression estimation unit for estimating a color impression of actual illumination in the region not influenced by camera flash; and
   a color balancing unit for correcting color of the region influenced by camera flash,
   wherein the depth value measurement unit measures an extent of blurring per pixel based on results from a single preview image or results from accumulation of a plurality of preview images, and measures the depth value of each region based on the measured extent of blurring per pixel.

2. The apparatus as set forth in claim 1, wherein the region identification unit determines whether each of the respective regions of the preview image is present within a predetermined range of the camera flash using the depth values measured by the depth value measurement unit.

3. The apparatus as set forth in claim 2, wherein the region identification unit identifies each region as the region influenced by a flash predetermined range if, as a result of the determination, the region is present within the predetermined range, or as the region not influenced by the camera flash if the region is not present within the predetermined range.

4. The apparatus as set forth in claim 1, wherein the color impression estimation unit estimates the color impression of actual illumination by estimating reference white of the region which was identified as the region not influenced by the flash.

5. An apparatus for balancing color of a flashed image using depth estimation, comprising:
   a depth value measurement unit for measuring depth values of respective regions of an image to be captured using a camera preview image;
   a region identification unit for identifying the regions of the preview image as a region influenced by camera flash or a region not influenced by camera flash using the depth values measured by the depth value measurement unit;
   a color impression estimation unit for estimating a color impression of actual illumination in the region not influenced by camera flash; and
   a color balancing unit for correcting color of the region influenced by camera flash,
   wherein the color balancing unit corrects the color of the region identified as the region influenced by camera flash based on reference white estimated by the color impression estimation unit, using the following Equation 1:

$$\begin{bmatrix} R \\ G \\ B \end{bmatrix} = \begin{bmatrix} R_w/R_r & 0 & 0 \\ 0 & G_w/G_r & 0 \\ 0 & 0 & B_w/B_r \end{bmatrix} \begin{bmatrix} R' \\ G' \\ B' \end{bmatrix} \quad (1)$$

where R, G, B refer to corrected colors, $R_w$, $G_w$, $B_w$, refer to reference white in the region not influenced by a flash, $R_r$, $G_r$, $B_r$ refer to reference white in the region influenced by a flash, and R', G', B' refer to non-corrected colors in the region influenced by a flash.

6. A method of balancing color of a flashed image using depth estimation, comprising:
   (a) a depth value measurement unit measuring depth values of respective regions of an image to be captured using a camera preview and further measuring an extent of blurring per pixel based on results from a single preview image or results from accumulation of a plurality of preview images, and further measuring the depth value of each region based on the measured extent of blurring per pixel;
   (b) when photographing is performed using camera flash, a region identification unit determines whether each of the respective regions of the preview image is present within a predetermined range of the camera flash using the depth values measured by the depth value measurement unit;
   (c) the region identification unit identifies each region as a region influenced by the camera flash if, as a result of the determination at step (b), the former region is present within the predetermined range, or as a region not influenced by the camera flash if the former region is not present within the predetermined range;
   (d) a color impression estimation unit estimates an color impression of actual illumination by estimating reference white of the region which was identified as the region not influenced by the camera flash; and
   (e) a color balancing unit corrects color of the region identified as the region influenced by camera flash based on the reference white estimated at step (d).

7. The method of claim 6, wherein the color balancing unit corrects the color of the region identified as the region influenced by camera flash based on reference white estimated by the color impression estimation unit, using the following Equation 1:

$$\begin{bmatrix} R \\ G \\ B \end{bmatrix} = \begin{bmatrix} R_w/R_r & 0 & 0 \\ 0 & G_w/G_r & 0 \\ 0 & 0 & B_w/B_r \end{bmatrix} \begin{bmatrix} R' \\ G' \\ B' \end{bmatrix} \quad (1)$$

where R, G, B refer to corrected colors, $R_w$, $G_w$, $B_w$ refer to reference white in the region not influenced by a flash, $R_r$, $G_r$, $B_r$ refer to reference white in the region influenced by a flash, and R', G', B' refer to non-corrected colors in the region influenced by a flash.

8. The method of claim 6, wherein the region identification unit determines whether each of the respective regions of the preview image is present within a predetermined range of the camera flash using the depth values measured by the depth value measurement unit.

9. The method of claim 8, wherein the region identification unit identifies each region as the region influenced by a flash predetermined range if, as a result of the determination, the region is present within the predetermined range, or as the region not influenced by the camera flash if the region is not present within the predetermined range.

10. The method of claim 6, wherein the color impression estimation unit estimates the color impression of actual illumination by estimating reference white of the region which was identified as the region not influenced by the flash.

* * * * *